(12) United States Patent
Okazaki et al.

(10) Patent No.: US 12,040,665 B2
(45) Date of Patent: Jul. 16, 2024

(54) ROTOR OF ROTATING ELECTRIC MACHINE AND METHOD OF MANUFACTURING ROTOR

(71) Applicant: Mitsubishi Electric Corporation, Tokyo (JP)

(72) Inventors: Masafumi Okazaki, Tokyo (JP); Satoru Akutsu, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 385 days.

(21) Appl. No.: 17/600,397

(22) PCT Filed: Jul. 11, 2019

(86) PCT No.: PCT/JP2019/027569
§ 371 (c)(1),
(2) Date: Sep. 30, 2021

(87) PCT Pub. No.: WO2021/005794
PCT Pub. Date: Jan. 14, 2021

(65) Prior Publication Data
US 2022/0216774 A1 Jul. 7, 2022

(51) Int. Cl.
*H02K 15/03* (2006.01)
*H02K 1/27* (2022.01)
(Continued)

(52) U.S. Cl.
CPC .......... *H02K 15/03* (2013.01); *H02K 1/276* (2013.01); *H02K 1/2791* (2022.01); *H02K 1/28* (2013.01); *H02K 7/003* (2013.01)

(58) Field of Classification Search
CPC ...... H02K 15/03; H02K 1/276; H02K 1/2791; H02K 1/28; H02K 7/003; H02K 1/30
See application file for complete search history.

(56) References Cited

U.S. PATENT DOCUMENTS

2008/0174200 A1 7/2008 Okamoto et al.
2012/0248920 A1* 10/2012 Takahashi ............... H02K 1/32
29/598

FOREIGN PATENT DOCUMENTS

EP 2 560 268 A2 2/2013
EP 2560268 A2 * 2/2013 ........... H02K 1/2773
(Continued)

OTHER PUBLICATIONS

International Search Report for PCT/JP2019/027569 dated Aug. 27, 2019 (PCT/ISA/210).
(Continued)

*Primary Examiner* — Thomas Truong
(74) *Attorney, Agent, or Firm* — Sughrue Mion, PLLC; Richard C. Turner

(57) ABSTRACT

Provided is a rotor of a rotating electric machine, including: a rotor core; an end plate provided at an end portion of the rotor core in an axial direction of the rotor core; and a shaft passing through the rotor core and the end plate along the axial direction. The end plate includes: a flat plate portion that has an annular shape and is held in contact with the rotor core; and a warp portion that is formed more on an inner peripheral side of the end plate than the flat plate portion and is held in contact with the shaft. In a radial cross section of the end plate, the warp portion is warped so as to be apart from the rotor core as extending away from the flat plate portion.

5 Claims, 10 Drawing Sheets

(51) Int. Cl.
*H02K 1/276* (2022.01)
*H02K 1/2791* (2022.01)
*H02K 1/28* (2006.01)
*H02K 7/00* (2006.01)

(56) References Cited

FOREIGN PATENT DOCUMENTS

| EP | 2 560 268 A3 | 9/2015 |
|----|---|---|
| JP | 2005-130688 A | 5/2005 |
| JP | 2005-229767 A | 8/2005 |
| JP | 2007-329986 A | 12/2007 |
| JP | 2008-178253 A | 7/2008 |

OTHER PUBLICATIONS

Communication dated May 17, 2022, issued in Japanese Application No. 2021-530462.
Extended European Search Report dated Jun. 20, 2022, issued in European Application No. 19936996.8.

* cited by examiner

ROTOR OF ROTATING ELECTRIC MACHINE AND METHOD OF MANUFACTURING ROTOR

CROSS REFERENCE TO RELATED APPLICATIONS

This application is a National Stage of International Application No. PCT/JP2019/027569 filed Jul. 11, 2019.

TECHNICAL FIELD

The present invention relates to a rotor of a rotating electric machine including a rotor core and an end plate, and to a method of manufacturing the rotor.

BACKGROUND ART

In Patent Literature 1, description is made of a method of manufacturing a rotor of an electric motor. The rotor includes a laminated core and a pair of end plates arranged on both sides of the laminated core in an axial direction. This manufacturing method includes a step of fitting a rotation shaft into a through-hole of the end plate formed into a dish shape so as to have elasticity in a thickness direction, and a step of bringing the end plate into contact with an end portion of the laminated core under a state in which the end plate is elastically deformed. In Patent Literature 1, it is described that, according to this manufacturing method, a contact state between the end portion of the laminated core and the end plate can be kept by an elastic restoration force of the end plate.

CITATION LIST

Patent Literature

[PTL 1] JP 2008-178253 A

SUMMARY OF INVENTION

Technical Problem

In the manufacturing method described above, the end plate is formed into a dish shape in advance. Accordingly, for example, when deformation such as warpage or distortion of the end plate occurs in the steps described above, a desired elastic force of the end plate cannot be obtained. Thus, the end plate and the laminated core are not always held in close contact with each other. As a result, there has been a problem in that a gap is formed between the end plate and the end portion of the laminated core in some cases.

The present invention has been made to solve the problem described above, and has an object to provide a rotor of a rotating electric machine capable of more reliably holding an end plate and a rotor core in close contact with each other, and to provide a method of manufacturing the rotor.

Solution to Problem

According to the present invention, there is provided a rotor of a rotating electric machine, including: a rotor core; an end plate provided at an end portion of the rotor core in an axial direction of the rotor core; and a shaft passing through the rotor core and the end plate along the axial direction, wherein the end plate includes: a flat plate portion that has an annular shape and is held in contact with the rotor core; and a warp portion that is formed more on an inner peripheral side of the end plate than the flat plate portion and is held in contact with the shaft, and wherein in a radial cross section of the end plate, the warp portion is warped so as to be apart from the rotor core as extending away from the flat plate portion.

According to the present invention, there is provided a method of manufacturing a rotor of a rotating electric machine, including a step of press-fitting a first press-fitted portion of a shaft, to which a rotor core is mounted, into a first through-hole of a first end plate that has a flat plate shape and is supported on a jig, the first press-fitted portion being located on one end side of the rotor core, wherein the jig includes: a flat surface portion configured to support the first end plate; a hole portion that is formed in a position surrounded by the flat surface portion, has a diameter larger than a diameter of the first through-hole and a diameter of the first press-fitted portion, and extends in a direction perpendicular to the flat surface portion; and a tapered surface formed between an inner peripheral surface of the hole portion and the flat surface portion.

Advantageous Effects of Invention

According to the present invention, it is possible to more reliably hold the end plate and the rotor core in close contact with each other.

DESCRIPTION OF EMBODIMENTS

First Embodiment

Figure 1:
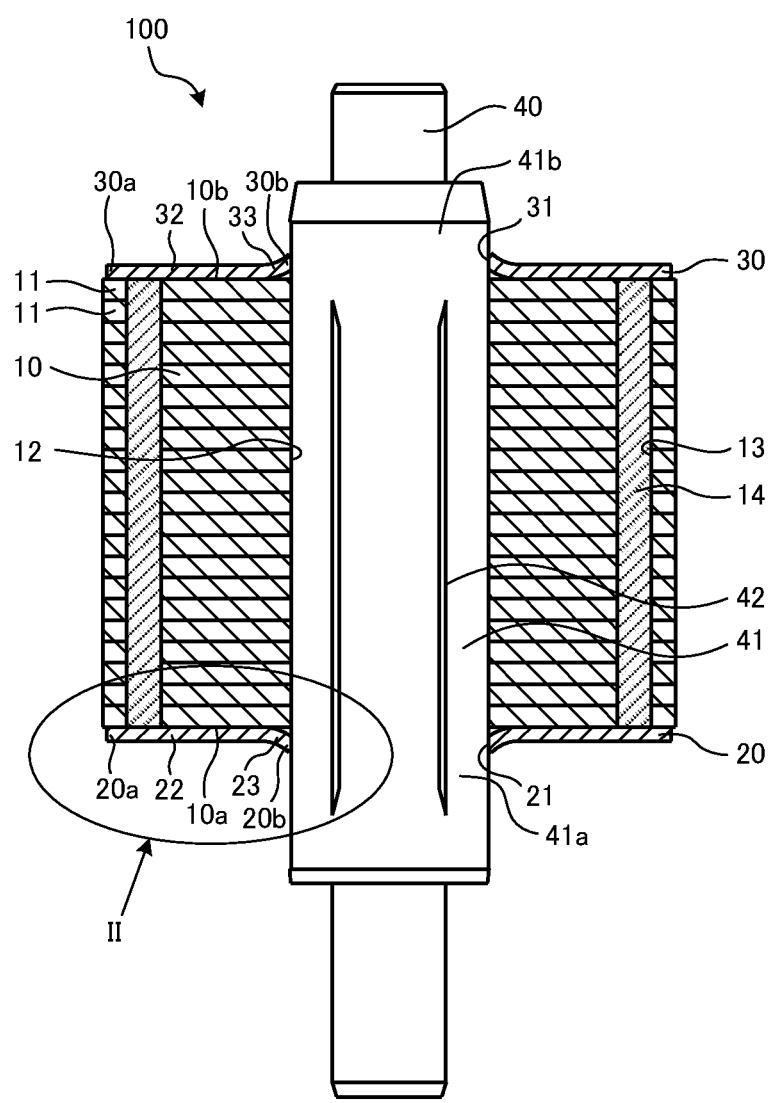
FIG. 1 is a sectional view for illustrating a configuration of a rotor of a rotating electric machine according to a first embodiment of the present invention.
Figure 2:
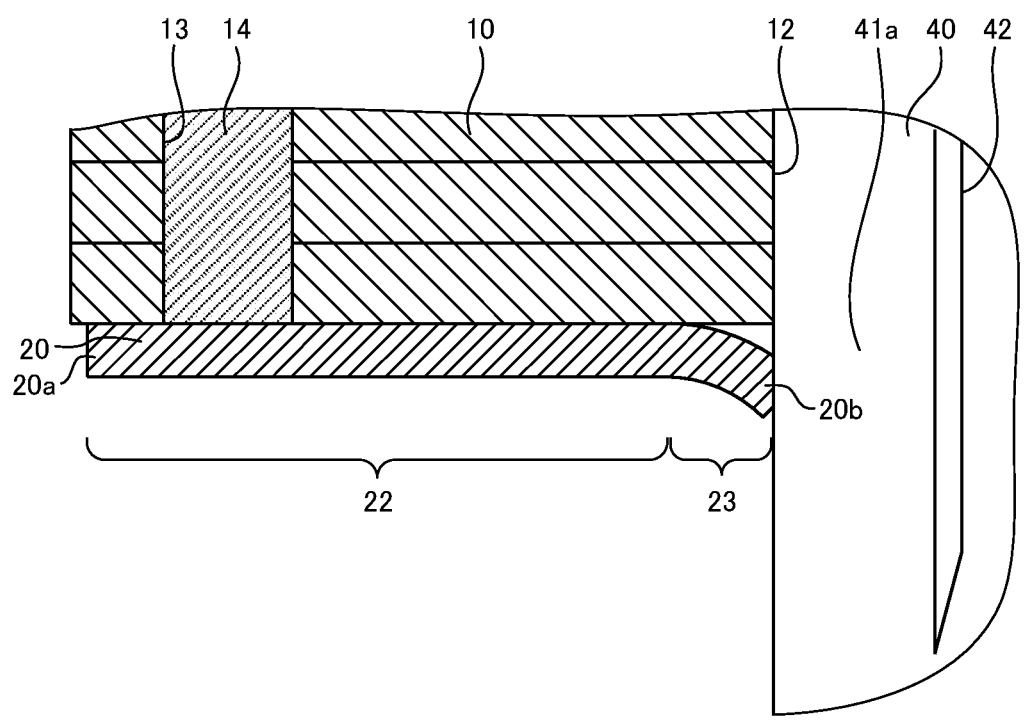
FIG. 2 is a sectional view for illustrating a portion II of FIG. 1 in an enlarged manner.

Description is made of a rotor of a rotating electric machine according to a first embodiment of the present invention and a method of manufacturing the rotor. First, a configuration of the rotor of the rotating electric machine according to this embodiment is described with reference to FIG. 1 and FIG. 2. FIG. 1 is a sectional view for illustrating a configuration of a rotor 100 of the rotating electric machine according to this embodiment. FIG. 2 is a sectional view for illustrating a portion II of FIG. 1 in an enlarger manner. In FIG. 1 and FIG. 2, radial cross sections of a rotor core 10, a first end plate 20, and a second end plate 30 are illustrated. In this embodiment, the rotor 100 of an interior permanent magnet (IPM) type including permanent magnets 14 embedded in the rotor is exemplified.

The rotor 100 illustrated in FIG. 1 and FIG. 2 is a component of a rotating electric machine of an inner rotor type. The rotating electric machine of the inner rotor type includes the rotor 100, and a stator (not shown) arranged on an outer peripheral side of the rotor 100. The rotor 100 is supported by a bearing (not shown) so as to be freely rotatable with respect to the stator. The rotor 100 includes the rotor core 10, the first end plate 20, the second end plate 30, and a shaft 40. The first end plate 20 is provided at one end portion of the rotor core 10 in an axial direction of the rotor core 10. The second end plate 30 is provided at the other end portion of the rotor core 10 in the axial direction. The shaft 40 passes through the rotor core 10, the first end plate 20, and the second end plate 30 along the axial direction.

The shaft 40 includes a large-diameter portion 41 in a portion thereof in the axial direction. The large-diameter portion 41 has a diameter larger than diameters of other portions of the shaft 40. The rotor core 10, the first end plate 20, and the second end plate 30 are fixed to the large-diameter portion 41. The large-diameter portion 41 includes a first press-fitted portion 41a and a second press-fitted portion 41b. The first press-fitted portion 41a is to be press-fitted into the first end plate 20. The second press-fitted portion 41b is to be press-fitted into the second end plate 30. Each of the first press-fitted portion 41a and the second press-fitted portion 41b is a part of the large-diameter portion 41 in the axial direction. As described later, first protrusions 42 are formed on an outer peripheral surface of the large-diameter portion 41 so as to extend in the axial direction.

The rotor core 10 is formed of a plurality of laminated electromagnetic steel sheets 11. The rotor core 10 has a cylindrical shape as a whole. A through-hole 12 is formed in a center portion of the rotor core 10 so as to pass through the rotor core 10 in the axial direction. The large-diameter portion 41 of the shaft 40 is fitted into the through-hole 12 of the rotor core 10 through press-fitting or shrink-fitting. In this manner, the rotor core 10 is fixed to the shaft 40. A plurality of magnet insertion holes 13 are formed more on an outer peripheral side of the rotor core 10 than the through-hole 12 so as to pass through the rotor core 10 in the axial direction. The permanent magnets 14 are inserted in the magnet insertion holes 13, respectively. One end portion of each of the magnet insertion holes 13 in the axial direction is closed by the first end plate 20. The other end portion of each of the magnet insertion holes 13 in the axial direction is closed by the second end plate 30.

The first end plate 20 and the second end plate 30 each have a disk shape. The first end plate 20 and the second end plate 30 are each made of a non-magnetic material such as SUS304. The first end plate 20 and the second end plate 30 are each made of a non-magnetic material to prevent reduction in magnetic force due to leakage of a magnetic flux of each of the permanent magnets 14 through the first end plate 20 or the second end plate 30.

A first through-hole 21 is formed in a center portion of the first end plate 20 so as to pass through the first end plate 20 in the axial direction. The first press-fitted portion 41a of the shaft 40 is press-fitted into the first through-hole 21. In this manner, the first end plate 20 is fixed to the shaft 40.

The first end plate 20 includes a flat plate portion 22 that is held in contact with an end surface 10a of the rotor core 10 on one end side in the axial direction. The flat plate portion 22 has an annular shape. As a matter of course, the flat plate portion 22 is provided more on the outer peripheral side than the first press-fitted portion 41a of the shaft 40. The flat plate portion 22 is provided around an entire periphery of the first press-fitted portion 41a in a circumferential direction of the first press-fitted portion 41a. A surface of the flat plate portion 22 and the end surface 10a of the rotor core 10 are held in surface contact with each other without a gap. An outer peripheral-side end portion of the flat plate portion 22, that is, an outer peripheral-side end portion 20a of the first end plate 20 is located more on an inner peripheral side of the rotor core 10 than an outer peripheral surface of the rotor core 10 when seen along the axial direction.

Further, the first end plate 20 includes a warp portion 23 formed more on the inner peripheral side than the flat plate portion 22 and arranged more on the outer peripheral side than the first press-fitted portion 41a of the shaft 40. An inner peripheral-side end portion of the warp portion 23, that is, an inner peripheral-side end portion 20b of the first end plate 20 is held in contact with an outer peripheral surface of the first press-fitted portion 41a. The warp portion 23 is provided around an entire periphery of the first press-fitted portion 41a in the circumferential direction of the first press-fitted portion 41a. In the radial cross section of the first end plate 20 as illustrated in FIG. 1 and FIG. 2, the warp portion 23 is warped so as to be apart from the end surface 10a of the rotor core 10 as extending away from the flat plate portion 22, that is, extending closer to the shaft 40. Further, in the radial cross section described above, the warp portion 23 is connected to the flat plate portion 22 smoothly and continuously, and is curved so as to protrude on the rotor core 10 side. A width of the warp portion 23, that is, a radial dimension of the warp portion 23 is smaller than a width of the flat plate portion 22, that is, a radial dimension of the flat plate portion 22.

Owing to the presence of the warp portion 23, the flat plate portion 22 is pressed onto the end surface 10a of the rotor core 10 by an elastic force of the first end plate 20 itself with the inner peripheral-side end portion 20b of the first end plate 20 serving as a fulcrum. Accordingly, the flat plate portion 22 is held in close contact with the end surface 10a of the rotor core 10 without a gap.

Similarly to the first end plate 20, a second through-hole 31 is formed in a center portion of the second end plate 30 so as to pass through the second end plate 30 in the axial direction. The second press-fitted portion 41b of the shaft 40 is press-fitted into the second through-hole 31. In this manner, the second end plate 30 is fixed to the shaft 40.

The second end plate 30 includes a flat plate portion 32 that is held in contact with an end surface 10b of the rotor core 10 on the other end side in the axial direction. The flat plate portion 32 has an annular shape. As a matter of course, the flat plate portion 32 is provided more on the outer peripheral side than the second press-fitted portion 41b of the shaft 40. The flat plate portion 32 is provided around an entire periphery of the second press-fitted portion 41b in a circumferential direction of the second press-fitted portion 41b. A surface of the flat plate portion 32 and the end surface 10b of the rotor core 10 are held in surface contact with each other without a gap. An outer peripheral-side end portion of the flat plate portion 32, that is, an outer peripheral-side end portion 30a of the second end plate 30 is located more on an inner peripheral side of the rotor core 10 than an outer peripheral surface of the rotor core 10 when seen along the axial direction.

Further, the second end plate 30 includes a warp portion 33 formed more on the inner peripheral side than the flat plate portion 32 and arranged more on the outer peripheral side than the second press-fitted portion 41b of the shaft 40. An inner peripheral-side end portion of the warp portion 33, that is, an inner peripheral-side end portion 30b of the second end plate 30 is held in contact with an outer peripheral surface of the second press-fitted portion 41b. The warp portion 33 is provided around an entire periphery of the second press-fitted portion 41b in the circumferential direction of the second press-fitted portion 41b. In the radial cross section of the second end plate 30 as illustrated in FIG. 1, the warp portion 33 is warped so as to be apart from the end surface 10b of the rotor core 10 as extending away from the flat plate portion 32, that is, extending closer to the shaft 40. Further, in the radial cross section described above, the warp portion 33 is connected to the flat plate portion 32 smoothly and continuously, and is curved so as to protrude on the rotor core 10 side. A width of the warp portion 33, that is, a radial dimension of the warp portion 33 is smaller than a width of the flat plate portion 32, that is, a radial dimension of the flat plate portion 32.

Owing to the presence of the warp portion 33, the flat plate portion 32 is pressed onto the end surface 10b of the rotor core 10 by an elastic force of the second end plate 30 itself with the inner peripheral-side end portion 30b of the second end plate 30 serving as a fulcrum. Accordingly, the flat plate portion 32 is held in close contact with the end surface 10a of the rotor core 10 without a gap.

As described above, the flat plate portion 22 of the first end plate 20 is held in close contact with the end surface 10a of the rotor core 10, and the flat plate portion 32 of the second end plate 30 is held in close contact with the end surface 10b of the rotor core 10. That is, the rotor core 10 is pressed by the first end plate 20 and the second end plate 30 from both end sides of the rotor core 10 in the axial direction. With this configuration, during operation of the rotating electric machine, the electromagnetic steel sheets 11 located at both end portions of the rotor core 10 in the axial direction can be prevented from being vibrated by an electromagnetic force. Further, axial positions of the permanent magnets 14 can be thus regulated. Accordingly, noise caused during operation of the rotating electric machine can be suppressed.

Figure 3:
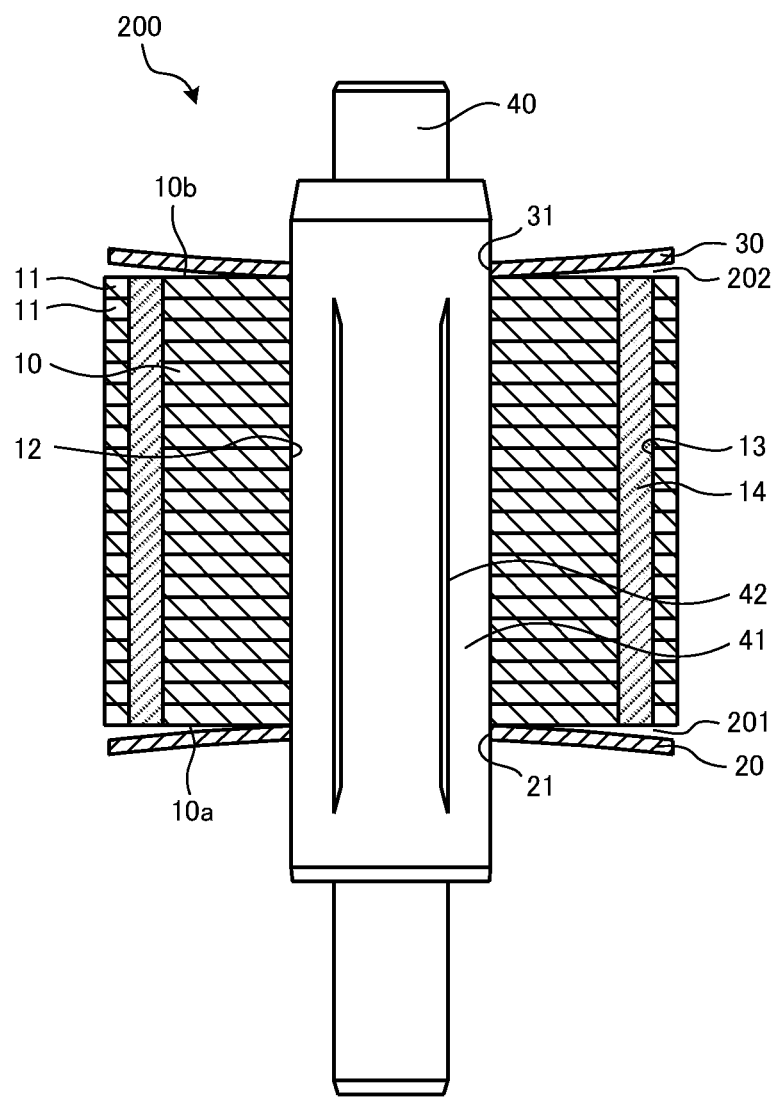
FIG. 3 is a sectional view for illustrating a configuration of a rotor of a rotating electric machine according to a comparative example of the first embodiment of the present invention.

Here, with reference to a comparative example, description is made of a state in which the first end plate 20 and the second end plate 30 are not held in close contact with the rotor core 10. FIG. 3 is a sectional view for illustrating a configuration of a rotor 200 of a rotating electric machine according to a comparative example of this embodiment. Also in the configuration of the comparative example illustrated in FIG. 3, the first end plate 20 and the second end plate 30 are fixed to the shaft 40 through press-fitting. However, in the configuration of the comparative example, an outer peripheral side of the first end plate 20 and an outer peripheral side of the second end plate 30 are warped in a direction of separating from the rotor core 10. As a result, a gap 201 is formed between the first end plate 20 and the end surface 10a of the rotor core 10, and a gap 202 is formed between the second end plate 30 and the end surface 10b of the rotor core 10. This is because the first end plate 20 and the second end plate 30 each having a flat plate shape before press-fitting are deformed by stress caused at the time of press-fitting. It is known that, when a force is locally applied to a periphery of a center hole of a flat plate-like member such as the first end plate 20 or the second end plate 30 and then the flat plate-like member is press-fitted to a columnar member such as the shaft 40, an outer peripheral side of the flat plate-like member is warped to a side opposite to a direction of applying the force to the flat plate-like member. Under the state as illustrated in FIG. 3, during operation of the rotating electric machine, the electromagnetic steel sheets 11 located at the both end portions of the rotor core 10 in the axial direction are vibrated by the electromagnetic force. In addition, the axial positions of the permanent magnets 14 cannot be regulated.

Figure 4:
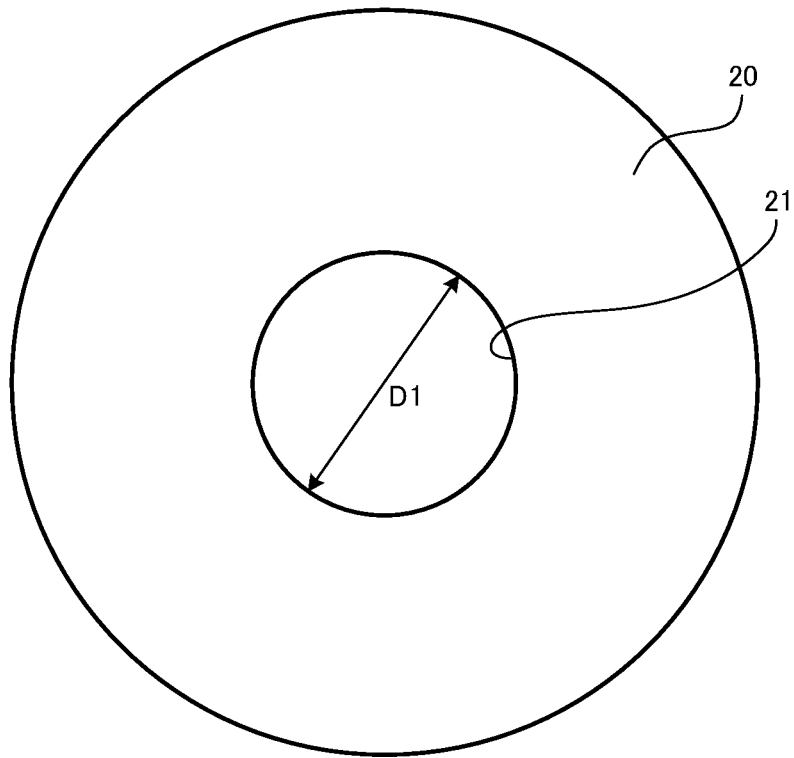
FIG. 4 is a plan view for illustrating a configuration of a first end plate to be used in a method of manufacturing the rotor of the rotating electric machine according to the first embodiment of the present invention.

Next, description is made of a method of manufacturing the rotor of the rotating electric machine according to this embodiment with reference to FIG. 4 to FIG. 13. FIG. 4 is a plan view for illustrating a configuration of the first end plate 20 to be used in the method of manufacturing the rotor of the rotating electric machine according to this embodiment. FIG. 4 is an illustration of the configuration of the first end plate 20 as a component before assembly of the rotor 100.

As illustrated in FIG. 4, the first end plate 20 has a disk shape and a flat plate shape. The first through-hole 21, into which the first press-fitted portion 41a of the shaft 40 is to be press-fitted, is formed in the center portion of the first end plate 20. The first through-hole 21 has a perfectly circular sectional shape. That is, a protrusion protruding radially inward and a recessed portion recessed radially outward are not formed on an inner peripheral surface of the first through-hole 21.

Figure 5:
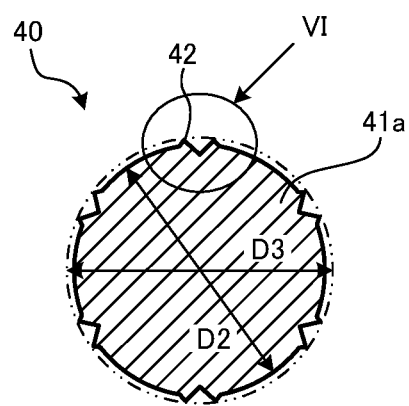
FIG. 5 is a sectional view for illustrating a configuration of a first press-fitted portion of a shaft to be used in the method of manufacturing the rotor of the rotating electric machine according to the first embodiment of the present invention.
Figure 6:
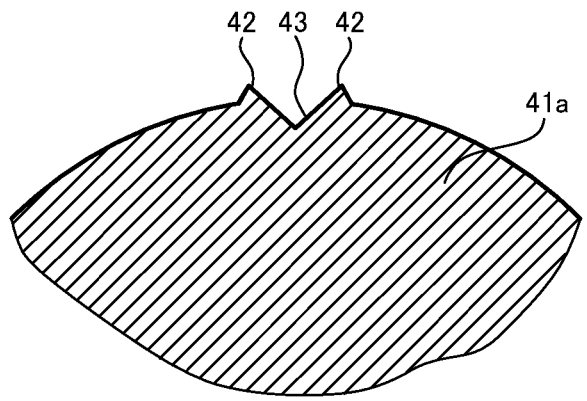
FIG. 6 is a sectional view for illustrating a portion VI of FIG. 5 in an enlarged manner.

FIG. 5 is a sectional view for illustrating a configuration of the first press-fitted portion 41a of the shaft 40 to be used in the method of manufacturing the rotor of the rotating electric machine according to this embodiment. FIG. 5 is an illustration of a sectional configuration of the shaft 40 as a component before assembly of the rotor 100, which is taken along a plane perpendicular to the axial direction. FIG. 6 is a sectional view for illustrating a portion VI of FIG. 5 in an enlarged manner.

As illustrated in FIG. 5 and FIG. 6, a plurality of first protrusions 42 are formed on the outer peripheral surface of the first press-fitted portion 41a of the shaft 40 so as to protrude radially outward. As illustrated in FIG. 1, each of the first protrusions 42 extends along the axial direction to a portion of the large-diameter portion 41 of the shaft 40 to be press-fitted into the rotor core 10. The first protrusions 42 each have a function of securing a fixing force exerted when the shaft 40 is press-fitted into the rotor core 10, and a function of securing a fixing force exerted when the shaft 40 is press-fitted into the first end plate 20. Between two adjacent first protrusions 42, a recessed portion 43 is formed.

The recessed portion 43 is capable of accommodating chips of the rotor core 10 chipped off by the first protrusions 42 at the time of press-fitting. A plurality of sets each including two first protrusions 42 and one recessed portion 43 are provided on the outer peripheral surface of the large-diameter portion 41 at equal intervals in the circumferential direction.

Here, D1 represents a diameter of the first through-hole 21 of the first end plate 20 illustrated in FIG. 4. D2 represents a diameter of a cylindrical portion of the first press-fitted portion 41a including no first protrusion 42 and no recessed portion 43. D3 represents a diameter of a circumscribed circle that has a center on a center axis of the shaft 40 and circumscribes the plurality of first protrusions 42. In this case, the diameter D1, the diameter D2, and the diameter D3 satisfy a relation of D2<D1<D3. When the above-mentioned relation is satisfied, the fixing force exerted when the first press-fitted portion 41a of the shaft 40 is press-fitted into the first end plate 20 is secured by the first protrusions 42.

Figure 7:
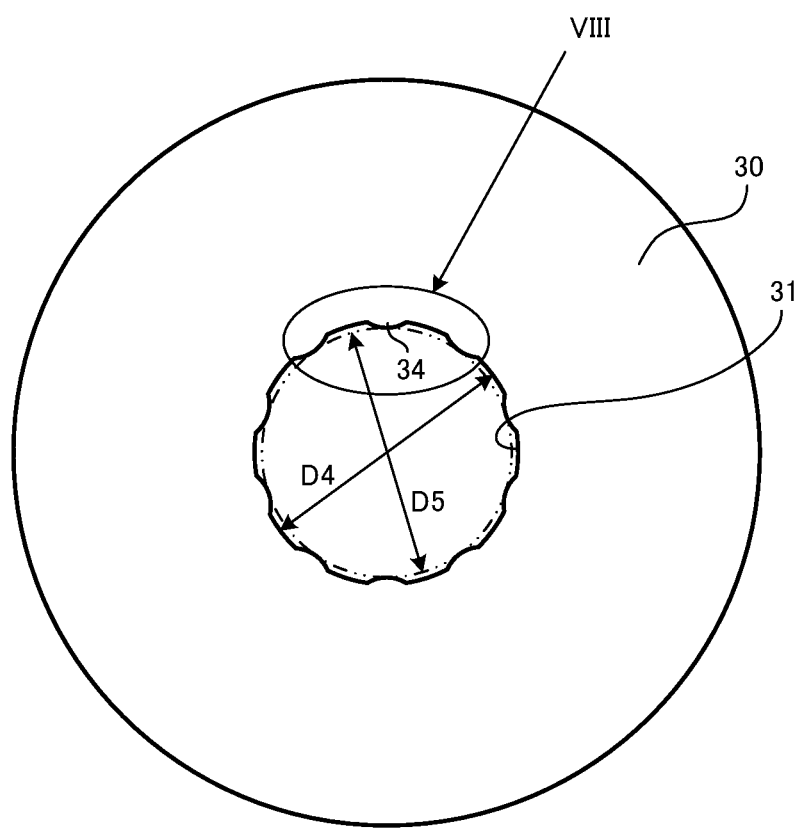
FIG. 7 is a plan view for illustrating a configuration of a second end plate to be used in the method of manufacturing the rotor of the rotating electric machine according to the first embodiment of the present invention.
Figure 8:
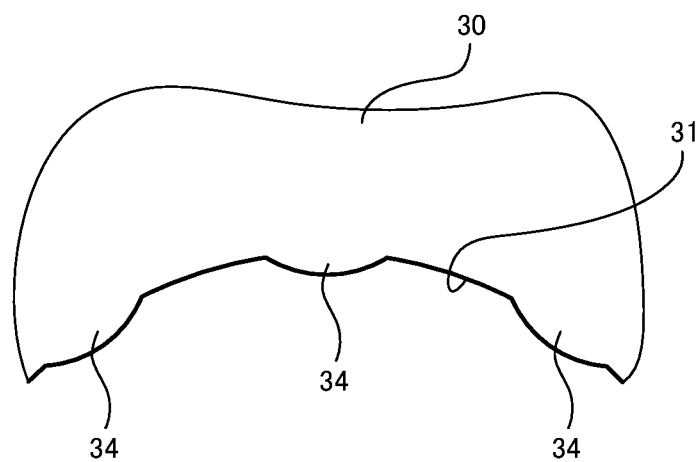
FIG. 8 is a plan view for illustrating a portion VIII of FIG. 7 in an enlarged manner.

FIG. 7 is a plan view for illustrating a configuration of the second end plate 30 to be used in the method of manufacturing the rotor of the rotating electric machine according to this embodiment. FIG. 7 is an illustration of the configuration of the second end plate 30 as a component before assembly of the rotor 100. FIG. 8 is a plan view for illustrating a portion VIII of FIG. 7 in an enlarged manner.

As illustrated in FIG. 7 and FIG. 8, the second end plate 30 has a disk shape and a flat plate shape. The second through-hole 31, into which the large-diameter portion 41 of the shaft 40 is to be press-fitted, is formed in the center portion of the second end plate 30. A plurality of second protrusions 34 protruding radially inward are formed on an inner peripheral surface of the second through-hole 31.

Figure 9:
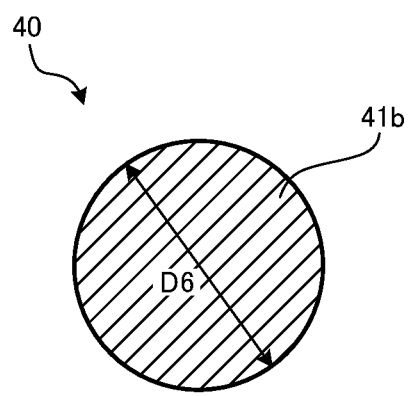
FIG. 9 is a sectional view for illustrating a configuration of a second press-fitted portion of the shaft to be used in the method of manufacturing the rotor of the rotating electric machine according to the first embodiment of the present invention.

FIG. 9 is a sectional view for illustrating a configuration of the second press-fitted portion 41b of the shaft 40 to be used in the method of manufacturing the rotor of the rotating electric machine according to this embodiment. FIG. 9 is an illustration of a sectional configuration of the shaft 40 as a component before assembly of the rotor 100, which is taken along a plane perpendicular to the axial direction.

As illustrated in FIG. 9, the second press-fitted portion 41b has a perfectly circular sectional shape. That is, a protrusion protruding radially outward and a recessed portion recessed radially inward are not formed on an outer peripheral surface of the second press-fitted portion 41b.

Here, in the second through-hole 31 of the second end plate 30 illustrated in FIG. 7, D4 represents a diameter of a cylindrical portion of the second through-hole 31 including no second protrusions 34. D5 represents a diameter of an inscribed circle that has a center on a center axis of the second through-hole 31 and is inscribed in the plurality of second protrusions 34. D6 represents a diameter of the second press-fitted portion 41b. In this case, the diameter D4, the diameter D5, and the diameter D6 satisfy a relation of D5<D6<D4. When the above-mentioned relation is satisfied, the fixing force exerted when the shaft 40 is press-fitted into the second end plate 30 is secured by the second protrusions 34. The diameter D6 of the second press-fitted portion 41b may be equal to the diameter D2 of the first press-fitted portion 41a. The diameter D4 of the second through-hole 31 may be equal to the diameter D1 of the first through-hole 21.

In this embodiment, the first press-fitted portion 41a and the second press-fitted portion 41b are different from each other in configuration, and the first end plate 20 and the second end plate 30 are different from each other in configuration. That is, the plurality of first protrusions 42 are formed on the outer peripheral surface of the first press-fitted portion 41a, whereas a protrusion and a recessed portion are not formed on the outer peripheral surface of the second press-fitted portion 41b. Further, a protrusion and a recessed portion are not formed on the inner peripheral surface of the first through-hole 21 of the first end plate 20, whereas the plurality of second protrusions 34 are formed on the inner peripheral surface of the second through-hole 31 of the second end plate 30. This is because the plurality of first protrusions 42 are not formed in the axial direction in an entire region of the large-diameter portion 41 to be press-fitted into the rotor core 10, and thus do not reach the second press-fitted portion 41b. When the shaft 40 is press-fitted into the rotor core 10, the inner peripheral surface of the rotor core 10 is chipped off by the first protrusions 42. When the first protrusions 42 are formed so as to be prevented from reaching the second press-fitted portion 41b, the chips of the rotor core 10 can be kept inside the rotor core 10.

However, the second press-fitted portion 41b may have the same configuration as that of the first press-fitted portion 41a, and the second end plate 30 may have the same configuration as that of the first end plate 20. That is, similarly to the first press-fitted portion 41a, the first protrusions 42 may also be formed on the outer peripheral surface of the second press-fitted portion 41b. Further, similarly to the first through-hole 21, the second through-hole 31 may also have a perfectly circular sectional shape. Alternatively, similarly to the second through-hole 31, the second protrusions 34 may also be formed on the inner peripheral surface of the first through-hole 21. Further, similarly to the second press-fitted portion 41b, the first press-fitted portion 41a may also have a perfectly circular sectional shape.

Figure 10:
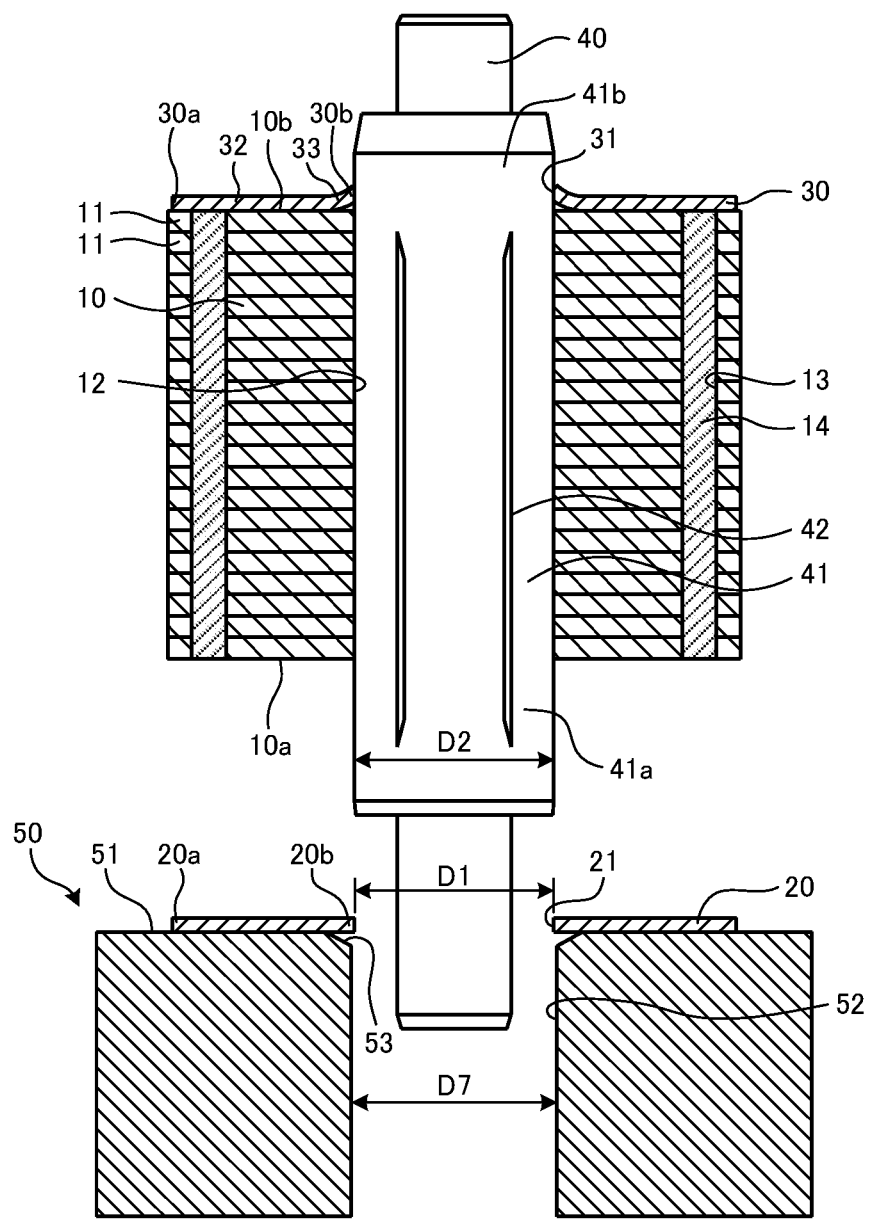
FIG. 10 is a sectional view for illustrating a step of manufacturing the rotor of the rotating electric machine according to the first embodiment of the present invention.
Figure 11:
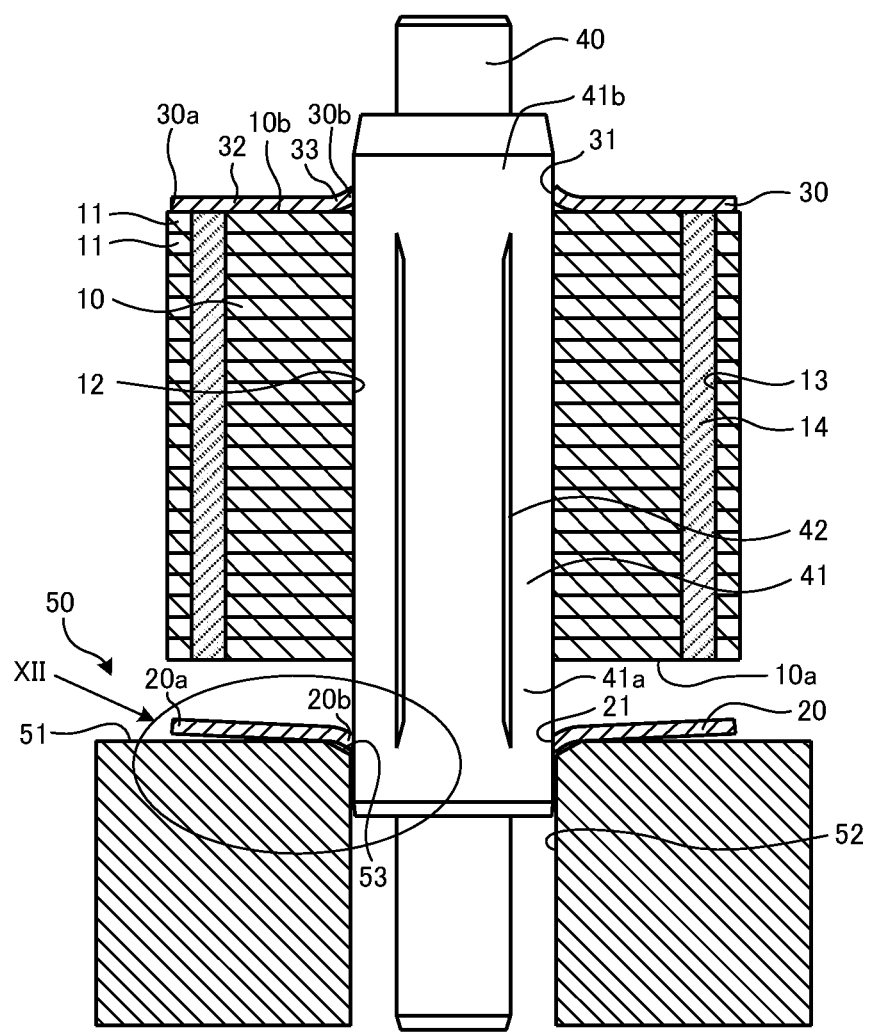
FIG. 11 is a sectional view for illustrating the step of manufacturing the rotor of the rotating electric machine according to the first embodiment of the present invention.
Figure 12:
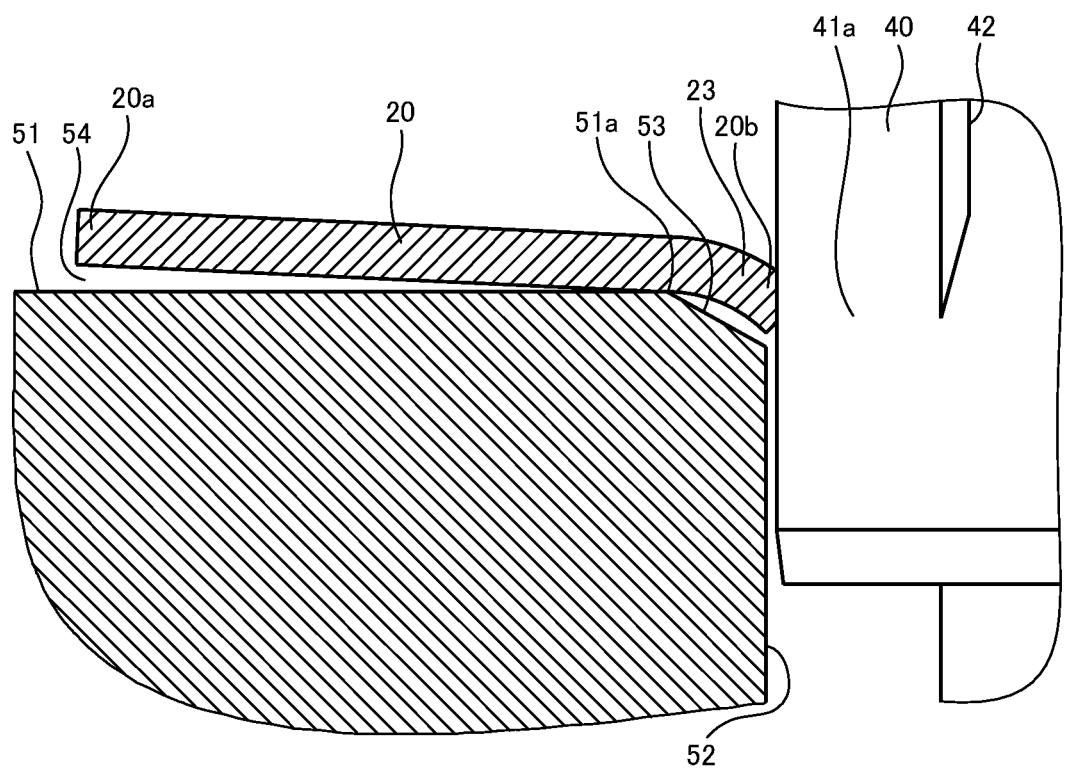
FIG. 12 is a sectional view for illustrating a portion XII of FIG. 11 in an enlarged manner.
Figure 13:
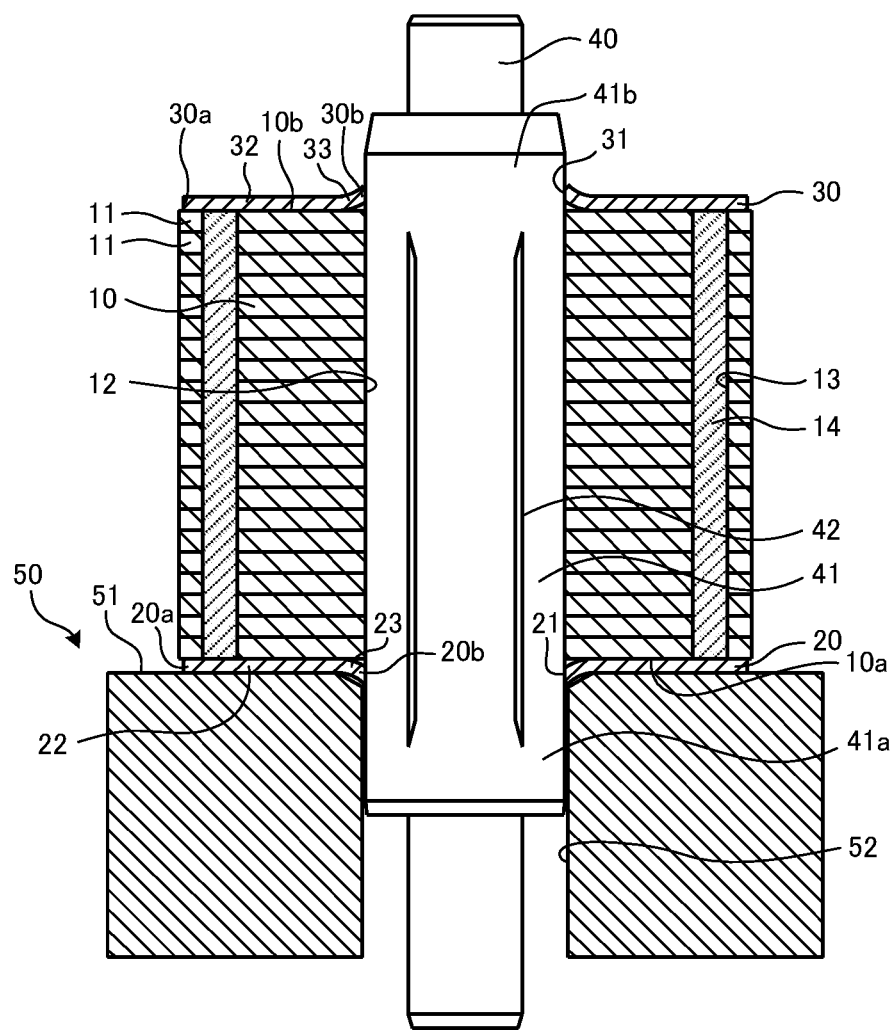
FIG. 13 is a sectional view for illustrating the step of manufacturing the rotor of the rotating electric machine according to the first embodiment of the present invention.

Next, description is made of steps of manufacturing the rotor 100 of the rotating electric machine according to this embodiment. FIG. 10, FIG. 11, and FIG. 13 are sectional views for illustrating the steps of manufacturing the rotor 100 of the rotating electric machine according to this embodiment. FIG. 12 is a sectional view for illustrating a portion XII of FIG. 11 in an enlarged manner. In FIG. 10 to FIG. 13, as part of the steps of manufacturing the rotor 100, a step of press-fitting the first press-fitted portion 41a of the shaft 40 into the first end plate 20 is illustrated. In the step illustrated in FIG. 10 to FIG. 13, the second end plate 30 is already mounted to the second press-fitted portion 41b through press-fitting. However, a step of press-fitting the second press-fitted portion 41b into the second end plate 30 may be performed after the step of press-fitting the first press-fitted portion 41a into the first end plate 20. The step of press-fitting the second press-fitted portion 41b into the second end plate 30 can be performed in the same manner as that of the step of press-fitting the first press-fitted portion 41a into the first end plate 20.

FIG. 10 is an illustration of a state before the shaft 40 is press-fitted into the first end plate 20. As illustrated in FIG. 10, in the step of press-fitting the first press-fitted portion 41a of the shaft 40 into the first end plate 20, first, the first end plate 20 having a flat plate shape is supported on a jig 50. The jig 50 includes a flat surface portion 51 and a hole portion 52. The flat surface portion 51 is configured to support the first end plate 20. The hole portion 52 is formed in a position surrounded by the flat surface portion 51, has a cylindrical shape, and extends in a direction perpendicular to the flat surface portion 51. When D7 represents a diameter of the hole portion 52, the diameter D7 satisfies a relation of D7>D1 and a relation of D7>D2. A tapered surface 53 is formed along an entire periphery of a corner portion between the flat surface portion 51 and an inner peripheral surface of the hole portion 52. The first end plate 20 is positioned so that a center of the hole portion 52 and a center of the first through-hole 21 match each other when seen from the direction perpendicular to the flat surface portion 51.

FIG. 11 and FIG. 12 are each an illustration of a state in the course of press-fitting the shaft 40 into the first end plate 20. As illustrated in FIG. 11 and FIG. 12, the first press-fitted portion 41a of the shaft 40 is gradually press-fitted into the first through-hole 21 of the first end plate 20. At this time, the inner peripheral-side end portion 20b of the first end plate 20 is deformed by stress caused as a result of press-fitting of the shaft 40. That is, the inner peripheral-side end portion 20b of the first end plate 20 is deformed along the tapered surface 53 with an inner peripheral edge portion 51a of the flat surface portion 51 serving as a fulcrum. In this manner, the inner peripheral-side end portion 20b of the first end plate 20 is warped in a direction of press-fitting the shaft 40. Thus, the warp portion 23 is formed on an inner peripheral side of the first end plate 20. Meanwhile, the outer peripheral-side end portion 20a of the first end plate 20 rises from the flat surface portion 51 with the inner peripheral edge portion 51a serving as a fulcrum. A gap 54 is formed between the outer peripheral-side end portion 20a and the flat surface portion 51. With those configurations, the first end plate 20 is deformed, as a whole, into a coned disc-spring shape protruding in the direction of separating from the rotor core 10.

FIG. 13 is an illustration of a state after completion of press-fitting the shaft 40 into the first end plate 20. As illustrated in FIG. 13, of the first end plate 20, an outer peripheral-side portion with respect to the warp portion 23 is sandwiched between the end surface 10a of the rotor core 10 and the flat surface portion 51 of the jig 50, and thus is deformed into a flat plate shape. In this manner, the flat plate portion 22 is formed in the first end plate 20. The flat plate portion 22 is pressed, by an elastic force of the first end plate 20 itself, onto the end surface 10b of the rotor core 10 with the inner peripheral-side end portion 20b serving as a fulcrum. Accordingly, the flat plate portion 22 is held in close contact with the end surface 10a of the rotor core 10 without a gap. In this case, the elastic force of the first end plate 20 is obtained as a result of deformation of the first end plate 20 itself into a coned disc-spring shape, which is caused along with press-fitting of the shaft 40. The first end plate 20 is deformed into a coned disc-spring shape mainly by an influence of the tapered surface 53 formed on the jig 50.

In the method of manufacturing the rotor of the electric motor described in Patent Literature 1, the end plate that is formed into a coned disc-spring shape in advance before press-fitting is used in order to hold a rotor core and the end plate in close contact with each other. However, in this manufacturing method, when the end plate is press-fitted to the shaft, the end plate may be warped to a side opposite to the rotor core. Accordingly, the end plate may vary in shape widely, and a desired elastic force of the end plate cannot be obtained in some cases. As a result, there has been a problem in that a gap is formed between the end plate and the rotor core in some cases. Moreover, the step of forming the end plate into a coned disc-spring shape is additionally required. Accordingly, there has also been a problem in that manufacturing cost of the rotor is increased along with an increase in the number of manufacturing steps.

Further, normally, in order to hold the end plate having a flat plate shape in close contact with the rotor core in the rotating electric machine, another component such as a rivet or a boss has been required. Accordingly, there has been a problem in that the manufacturing cost of the rotor is increased along with an increase in the number of components and the increase in the number of manufacturing steps.

In contrast, in this embodiment, each of the first end plate 20 and the second end plate 30 is held, by its own elastic force, in close contact with the rotor core 10 without a gap. With this configuration, during operation of the rotating electric machine, the electromagnetic steel sheets 11 located at the both end portions of the rotor core 10 in the axial direction can be prevented from being vibrated by the electromagnetic force. Further, the axial positions of the permanent magnets 14 can be thus regulated. Accordingly, the noise caused during operation of the rotating electric machine can be suppressed. Moreover, in this embodiment, components each having a flat plate shape can be used as the first end plate 20 and the second end plate 30, and it is not required to add another component such as a rivet or a boss. Thus, simplification of the steps of manufacturing the rotor 100, and reduction in manufacturing cost of the rotor 100 can be achieved.

As described above, the rotor 100 of the rotating electric machine according to this embodiment includes the rotor core 10, the first end plate 20, and the shaft 40. The first end plate 20 is provided at the end portion of the rotor core 10 in the axial direction of the rotor core 10. The shaft 40 passes through the rotor core 10 and the first end plate 20 along the axial direction. The first end plate 20 includes the flat plate portion 22 having an annular shape, and the warp portion 23. The flat plate portion 22 is held in contact with the rotor core 10. The warp portion 23 is formed more on the inner peripheral side than the flat plate portion 22, and is held in contact with the shaft 40. In the radial cross section of the first end plate 20, the warp portion 23 is warped so as to be apart from the rotor core 10 as extending away from the flat plate portion 22. Here, the first end plate 20 is an example of an end plate.

With this configuration, the flat plate portion 22 of the first end plate 20 is pressed onto the rotor core 10 by the elastic force of the first end plate 20 itself. Thus, with the configuration described above, the first end plate 20 and the rotor core 10 can be held in close contact with each other more reliably.

The method of manufacturing the rotor 100 of the rotating electric machine according to this embodiment includes the step of press-fitting the first press-fitted portion 41a of the shaft 40, to which the rotor core 10 is mounted, into the first through-hole 21 of the first end plate 20 that has a flat plate shape and is supported on the jig 50. The first press-fitted portion 41a is located on one end side of the rotor core 10. The jig 50 includes the flat surface portion 51, the hole portion 52, and the tapered surface 53. The flat surface portion 51 is configured to support the first end plate 20. The hole portion 52 is formed in the position surrounded by the flat surface portion 51, and has the diameter D7 larger than the diameter D1 of the first through-hole 21 and the diameter D2 of the first press-fitted portion 41a. The hole portion 52 extends in the direction perpendicular to the flat surface portion 51. The tapered surface 53 is formed between the inner peripheral surface of the hole portion 52 and the flat surface portion 51.

With this configuration, in the step of press-fitting the first press-fitted portion 41a into the first through-hole 21, the inner peripheral-side end portion of the first end plate 20 is deformed along the tapered surface 53. Thus, the first end plate 20 is deformed, as a whole, into a coned disc-spring shape. After completion of press-fitting the first press-fitted portion 41a into the first through-hole 21, the first end plate 20 is pressed onto the rotor core 10 by the elastic force of the first end plate 20 itself. Thus, the first end plate 20 and the rotor core 10 can be held in close contact with each other more reliably.

Further, in the method of manufacturing the rotor 100 of the rotating electric machine according to this embodiment, the first protrusions 42 are formed on the outer peripheral surface of the first press-fitted portion 41a, and the first through-hole 21 has a perfectly circular sectional shape. With this configuration, the fixing force exerted between the first end plate 20 and the shaft 40 can be secured by the first protrusions 42.

Further, in the method of manufacturing the rotor 100 of the rotating electric machine according to this embodiment, the first press-fitted portion 41a has a perfectly circular sectional shape, and the second protrusions 34 are formed on the inner peripheral surface of the first through-hole 21. With this configuration, the fixing force exerted between the first end plate 20 and the shaft 40 can be secured by the second protrusions 34.

Further, the method of manufacturing the rotor 100 of the rotating electric machine according to this embodiment further includes the step of press-fitting the second press-fitted portion 41b of the shaft 40 into the second through-hole 31 of the second end plate 30 that has a flat plate shape and is supported on the jig 50, the second press-fitted portion 41b being located on the other end side of the rotor core 10. The first protrusions 42 are formed on the outer peripheral surface of the first press-fitted portion 41a. The first through-hole 21 has a perfectly circular sectional shape. The second press-fitted portion 41b has a perfectly circular sectional shape. The second protrusions 34 are formed on the inner peripheral surface of the second through-hole 31. With this configuration, the fixing force exerted between the first end plate 20 and the shaft 40 can be secured by the first protrusions 42, and the fixing force exerted between the second end plate 30 and the shaft 40 can be secured by the second protrusions 34.

The present invention is not limited to the embodiment described above, and various modifications can be made thereto. For example, in the embodiment described above, the rotor 100 of the IPM type is given as an example. However, the present invention is applicable to rotors of various types such as a surface permanent magnet (SPM) type, a consequent type and an inset type.

REFERENCE SIGNS LIST 10 rotor core, 10a, 10b end surface, 11 electromagnetic steel sheets, 12 through-hole, 13 magnet insertion hole, 14 permanent magnet, 20 first end plate, 20a outer peripheral-side end portion, 20b inner peripheral-side end portion, 21 first through-hole, 22 flat plate portion, 23 warp portion, 30 second end plate, 30a outer peripheral-side end portion, 30b inner peripheral-side end portion, 31 second through-hole, 32 flat plate portion, 33 warp portion, 34 second protrusion, 40 shaft, 41 large-diameter portion, 41a first press-fitted portion, 41b second press-fitted portion, 42 first protrusion, 43 recessed portion, 50 jig, 51 flat surface portion, 51a inner peripheral edge portion, 52 hole portion, 53 tapered surface, 54 gap, 100, 200 rotor, 201, 202 gap

The invention claimed is:

1. A rotor of a rotating electric machine, comprising:
a rotor core;
a first end plate provided at one end portion of the rotor core in an axial direction of the rotor core; and
a second end plate provided at an other end portion of the rotor core in an axial direction of the rotor core;
a shaft passing through the rotor core, the first end plate, and the second end plate along the axial direction,
wherein each of the first end plate and the second end plate include:
a flat plate portion that has an annular shape and is held in contact with the rotor core; and
a warp portion that is formed more on an inner peripheral side of the end plate than the flat plate portion and is held in contact with the shaft,
wherein in a radial cross section of each of the first end plate and the second end plate, each of the warp portion is warped so as to be apart from the rotor core as extending away from the flat plate portion,
wherein the shaft includes a first press-fitted portion and a second press-fitted portion,
wherein the first press-fitted portion is to be press-fitted into the first end plate,
wherein the second press-fitted portion is to be press-fitted into the second end plate,
wherein plurality of first protrusions are formed on an outer peripheral surface of the first press-fitted portion,
wherein between two adjacent ones of the first protrusions of the plurality of the first protrusions, a recessed portion is formed,
wherein each of the first protrusions extends along the axial direction, and
wherein each of the plurality of first protrusions do not reach an outer peripheral surface of the second press-fitted portion.

2. A method of manufacturing a rotor of a rotating electric machine, comprising a step of press-fitting a first press-fitted portion of a shaft, to which a rotor core is mounted, into a first through-hole of a first end plate that has a flat plate shape and is supported on a jig, the first press-fitted portion being located on one end side of the rotor core,
wherein the jig includes:
a flat surface portion configured to support the first end plate;
a hole portion that is formed in a position surrounded by the flat surface portion, has a diameter larger than a diameter of the first through-hole and a diameter of the first press-fitted portion, and extends in a direction perpendicular to the flat surface portion; and
a tapered surface formed between an inner peripheral surface of the hole portion and the flat surface portion.

3. The method of manufacturing a rotor of a rotating electric machine according to claim 2,
wherein a first protrusion is formed on an outer peripheral surface of the first press-fitted portion, and
wherein the first through-hole has a perfectly circular sectional shape.

4. The method of manufacturing a rotor of a rotating electric machine according to claim 2,
wherein the first press-fitted portion has a perfectly circular sectional shape, and
wherein a second protrusion is formed on an inner peripheral surface of the first through-hole.

5. The method of manufacturing a rotor of a rotating electric machine according to claim 2, further comprising a step of press-fitting a second press-fitted portion of the shaft into a second through-hole of a second end plate that has a flat plate shape and is supported on the jig, the second press-fitted portion being located on the other end side of the rotor core,
 wherein a first protrusion is formed on an outer peripheral surface of the first press-fitted portion,
 wherein the first through-hole has a perfectly circular sectional shape,
 wherein the second press-fitted portion has a perfectly circular sectional shape, and
 wherein a second protrusion is formed on an inner peripheral surface of the second through-hole.

* * * * *